Jan. 16, 1951 — W. H. GUSHARD ET AL — 2,538,684
CONTAINER
Filed April 21, 1948
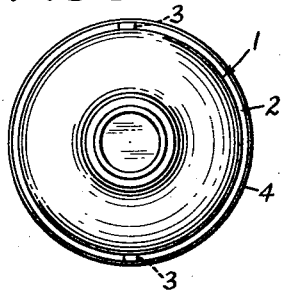
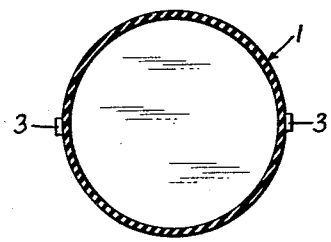
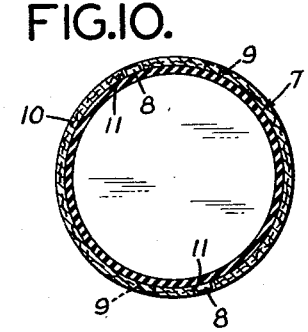
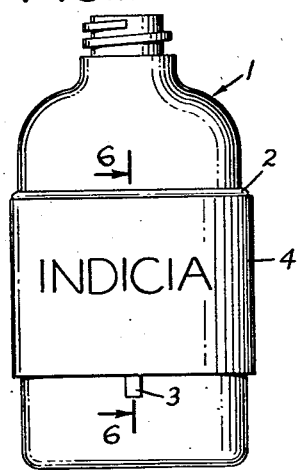
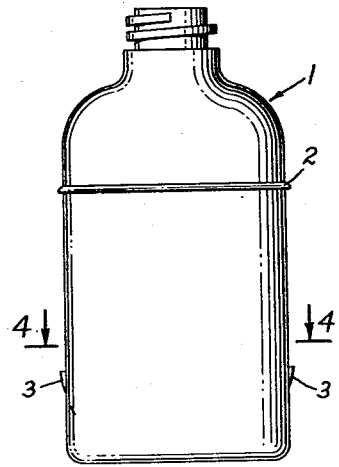
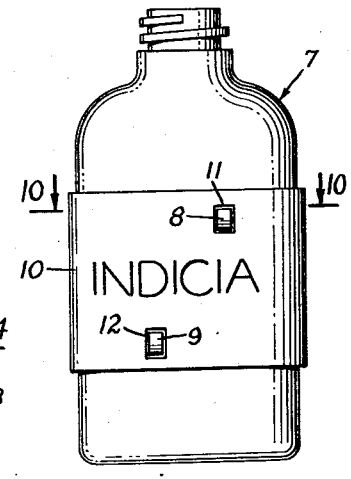
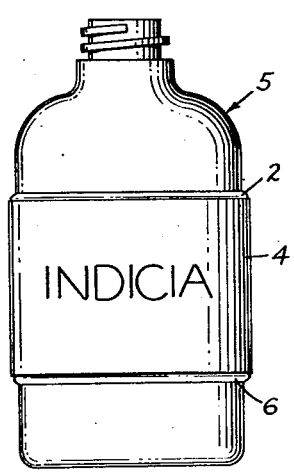
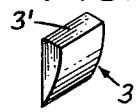
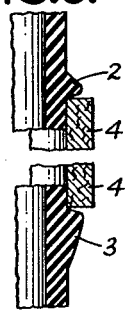
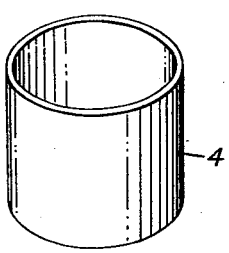
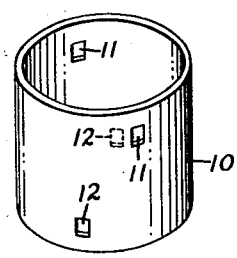
INVENTORS.
WILLIAM H. GUSHARD
JAMES J. STAITI
BY Max Geldin
ATTORNEY.

Patented Jan. 16, 1951

2,538,684

UNITED STATES PATENT OFFICE 2,538,684

CONTAINER

William H. Gushard, Flushing, and James J. Staiti, New York, N. Y., assignors to Allied Chemical & Dye Corporation, New York, N. Y., a corporation of New York Application April 21, 1948, Serial No. 22,434

5 Claims. (Cl. 215—1)

This invention relates to a new and improved type of container and more particularly is directed to an improved plastic bottle especially adapted for packaging reagent hydrofluoric acid.

The development of plastics and plastic molding technique particularly with respect to thermoplastic materials has directed considerable interest to the application of plastics for containers of all types. However, glass containers or bottles are still almost invariably employed for packaging chemical laboratory reagents and for other purposes where constant handling of the container is required. Plastic containers, otherwise suitable from the standpoint of being inert and impermeable towards the chemical reagents or other materials contained therein often do not possess enough rigidity to insure reasonable safety.

In the packaging of certain reagent chemicals which attack glass, notably hydrofluoric acid, use of containers constructed of suitably inert and impermeable materials other than glass is, of course, in any event necessary to maintain purity of the container contents. Although wax bottles have been employed for this purpose, such bottles have proved unsatisfactory because in warm weather the wax softens and the bottle accordingly becomes slippery and also tends to belly and deform on handling, while in cold weather the wax becomes brittle and such bottles are thus easily cracked or broken even when handled with care. There has accordingly developed a real need for a plastic container or bottle particularly adapted for packaging reagent chemicals which attack glass, especially hydrofluoric acid, and which is of sufficient strength and durability to withstand the rigors of constant handling and squeezing without becoming deformed or ruptured.

It is an object of the invention to provide a strong and highly safe container especially suitable for packaging chemical laboratory reagents. A further object is to furnish a plastic container or bottle constructed of a relatively flexible material such as polyethylene, particularly adapted for packaging chemical reagents which attack glass, notably hydrofluoric acid, and having a reinforced side wall. Another aim of the invention is to provide a plastic bottle the flexible side wall of which is especially adapted structurally to be reinforced by means of a suitable external cooperating member. Yet another object of the invention is to provide procedure for reinforcing the flexible side wall of a plastic bottle to produce the above noted strong durable container.

Other objects and advantages will appear as the description of the invention proceeds.

In accordance with our invention we have provided a container highly resistant to deformation and rupture through constant handling and which is eminently suited for packaging small quantities of chemical laboratory reagents, particularly those attacking glass, which container broadly comprises a flexible side wall, retaining means positioned on the outer surface of said side wall and a substantially rigid reinforcing member held substantially securely and snugly against the side wall outer surface by such retaining means. More precisely our device embodies the features including a flexible plastic bottle, preferably constructed of polyethylene, having retaining means in the form of ribs and/or lugs molded on the outer surface of the bottle side wall, and a substantially rigid band skirting the outer surface of the bottle and held substantially securely and snugly against such outer surface by the ribs and/or lugs. We have further discovered that the above rigid side wall reinforcing band may be readily assembled on the flexible bottle side wall by procedure involving, broadly, forcing the band into a predetermined position onto the bottle side wall while deforming the bottle, and then permitting the bottle to regain its original shape so that the band is held substantially securely and snugly against the outer surface of the side wall.

As illustrative of our invention, reference is had to the accompanying drawing in which Fig. 1 is a front elevation of a preferred embodiment of our bottle and reinforcing band, Fig. 2 is a front elevation of the bottle of Fig. 1 rotated 90° and with reinforcing band removed, Fig. 3 is a top view of the device of Fig. 1, Fig. 4 is a horizontal cross section taken on line 4—4 of Fig. 2, Fig. 5 is a perspective view of the reinforcing band employed in the devices of Figs. 1 and 8, Fig. 6 is an enlarged fragmentary section along line 6—6 of Fig. 1, Fig. 7 is an enlarged perspective view of the lugs on the bottle of Fig. 2, Fig. 8 is an alternative type bottle and band, Fig. 9 is yet another alternative type bottle and band, Fig. 10 is a horizontal cross section taken on line 10—10 of Fig. 9, and Fig. 11 is a perspective view of the reinforcing band employed in the device of Fig. 9.

Numeral 1 designates a circular flexible bottle constructed of any suitable plastic material such as polyethylene, cellulose acetate or cellulose butyrate. When used as a reagent bottle for hydrofluoric acid, polyethylene is the preferred material of construction from standpoint of being inert toward reaction with hydrofluoric acid and highly impermeable to escape of hydrofluoric acid vapors therefrom. Molded in a horizontal plane around the upper outer surface of bottle 1 is a rib 2 which completely encircles the bottle in a solid continuous fashion. If desired, however, such rib may be molded in broken regular or irregular segments about the bottle side wall. As shown more clearly in Fig. 6 rib 2 may be beveled on its upper edge. On the lower side wall surface of bottle 1 below rib 2 are molded two lugs 3 equally spaced in horizontal relation along the circumference and on opposite sides of the bottle side wall. Lugs 3 may be of any desired shape and as shown in Fig. 7 are tapered from a point at the bottom to a width at the top sufficient to form a shoulder 3' extending about the same height above the bottle side wall surface as the top of rib 2.

Disposed between rib 2 and lugs 3 is a rigid cylindrical band 4 of any suitable material such as paperboard, metal or plastic. Such band shown in Fig. 5 is circular in shape and has an inside diameter barely larger than the outside diameter of the side wall surface of bottle 1 and smaller than the outside diameter of rib 2. Band 4 is of such width that when assembled on the bottle the upper and lower edges of the band lie closely adjacent the inside edge of rib 2 and the shoulders of lugs 3 respectively, as clearly shown in Fig. 6. In this manner band 4 is held in position securely and snugly against the outer surface of the side wall of bottle 1 and is prevented from either rotating or moving in a vertical direction both by friction of its inside surface against the outer bottle wall surface and by rib 2 and lugs 3. Band 4, preferably constructed of a fibrous substance, such as $\frac{1}{16}$" paperboard, is of sufficient width and thickness to lend rigidity and support to the bottle side wall. The width of the band may ordinarily be such as to cover only a fraction (e. g. $\frac{1}{3}$ to $\frac{2}{3}$) of the bottle side wall surface, as shown in Fig. 1. The height of the retaining rib and lugs above the side wall surface may be approximately the same as or preferably somewhat less than the thickness of such band, as shown in Fig. 6, provided the rib and lugs are of sufficient height to prevent the assembled band from readily slipping over them and out of position. No advantage is gained by use of ribs and lugs of substantially greater height than the thickness of rigid band 4. As a matter of fact, this is undesirable from the standpoint of assembling band 4 on the bottle, since greater force is required to pass the band over such ribs and lugs in the manner hereafter described. Suitable indicia or advertising matter may be printed on band 4, or a thin sheet of paper in the form of a label may be applied by adhesive or any other suitable means to the surface of band 4, either before or after the band is assembled on the bottle.

In Fig. 8 is shown a plastic bottle 5 similar in all respects to bottle 1 of Fig. 1 except that in place of lugs 3 of bottle 1, bottle 5 has a rib 6 of the same type as rib 2 molded in a horizontal plane around the lower portion of the side wall of bottle 5 below rib 2. Band 4 is positioned between the inside edges of ribs 2 and 6, and is thus held securely from rotation and vertical movement against the side wall of bottle 5 both by friction of its inside surface against the outer bottle wall surface and by ribs 2 and 6 as in the case of the device of Fig. 1.

Fig. 9 represents another alternative type of bottle 7 having two square shaped lugs or projections 8 molded in opposite horizontal relation on the upper surface of the bottle side wall and two similar lugs or projections 9 molded in opposite horizontal relation on the lower surface of the bottle side wall and staggered with respect to upper lugs 8. In this embodiment reinforcing band 10, shown more clearly in Fig. 11, contains holes or slots 11 and 12 adapted to fit into lugs or projections 8 and 9 respectively of bottle 7. When assembled on bottle 7 band 10 is accordingly held locked securely in position by lugs 8 and 9 and is thus prevented from sliding or slipping on the bottle in either a horizontal or vertical direction.

It is apparent from the above description and drawing that various alternative retaining means may be employed for securing the rigid reinforcing band to the flexible bottle side wall. Thus there may be molded onto the side wall surface of the bottle expanded sections or projections in the form of ribs, lugs or stops arranged to cooperate with either the edges of the rigid band or openings or depressions therein, or the bottle side wall may have depressed sections molded therein to cooperate or coincide with similarly shaped expanded portions on the rigid band. These means may be employed either separately or in any combination to accomplish the positioning and securing of the rigid band against the flexible bottle wall. The retaining means in the form of ribs, lugs, depressions, etc., may be arranged in any desired manner on the bottle side wall surface so as to accommodate a rigid band of the width required.

An important feature of our invention resides in the manner of assembling the rigid band on the bottle side wall. This may be accomplished, for example, with respect to bottle 1 of Fig. 2, by grasping the head of the bottle using any suitable means such as a die having the same shape as the shoulder of the bottle, and slipping rigid band 4 over the bottom of the bottle and forcing the band over lugs 3 while deforming the bottle slightly until the band is completely disposed between rib 2 and lugs 3, following which the bottle is permitted to regain its original shape, thus causing the band to be held securely and snugly both by friction and rib 2 and lugs 3 against the outer surface of the bottle and free from movement in any direction. To minimize the force required to permit passage of band 4 over lugs 3, the bottle may first be subjected to reduced temperature to cause contraction of the plastic. If desired, band 4 may alternatively be assembled on the bottle side wall by first applying an outside pressure to the flexible bottle side wall to deform same uniformly and then passing the band over lugs 3 and into position between lugs 3 and rib 2, after which such pressure may be released to secure the band in position on the bottle side wall. The construction of bottle 1 with only two lugs on the lower side wall portion thereof for positioning the lower edge of band 4, is preferred because only a minimum of force is required to pass the band over such lugs and into position between lugs 3 and rib 2.

Similarly, to assemble band 4 on bottle 5 of Fig. 8 the bottle may be grasped and held securely in position by any suitable means and the band slipped over either the top or bottom of the bottle and forced over either rib 2 at the top of the bottle or rib 6 at the bottom thereof until the band is disposed entirely between ribs 2 and 6, securing the band tightly in position between such ribs. With respect to assembling band 10 on bottle 7 of Fig. 9 the bottle may be maintained securely in position and the band slipped over either the top or bottom of the bottle and forced over projections 8 and 9 until such projections coincide with the holes or slots 11 and 12 respectively of band 10, resulting in the locking in position on the bottle side wall of reinforcing band 10.

It will be seen from the above that several advantages accrue from practice of the invention. First and foremost is the provision of a flexible plastic bottle which, in addition to possessing the conventional advantages of the use of plastic material for packaging chemical laboratory reagents which ordinarily attack glass, contains a reinforced and rigidified side wall highly resistant to deformation or breakage by handling. As the rigid reinforcing band is anchored in place on the bottle, the latter cannot slip out of the band which thus provides a suitable holding area by which the bottle may be grasped to prevent the body of the bottle from being squeezed directly, and accordingly eliminating the chance of squirting the contents, particularly the dangerous hydrofluoric acid, out of the bottle. For translucent plastic bottles of the type herein contemplated, only a minimum of side wall area requires covering by the rigid band in order to impart stiffness to the side wall, thus retaining the ability to visually inspect the interior for liquid level of contents at any time. Further, no adhesive is required to secure the rigid band to the flexible bottle side wall. Also, the rigid reinforcing band or cylinder may be used as a labeling surface, especially on those plastic bottles for which no ordinary adhesive will satisfactorily bind the label directly to the bottle. This expedient avoids the possibility of losing the label, since the reinforcing band is held securely in position on the bottle by mechanical means rather than by adhesive. Finally, assembling of the rigid reinforcing band on the plastic bottle by the above noted method is easily and quickly accomplished with a minimum of labor and expense.

Although the invention has been described particularly with respect to plastic bottles of circular cross section, bottles of elliptical, square, rectangular or irregular cross section are likewise suitable in the practice of the invention. However, the rigid reinforcing band employed must be of the same geometric form as the cross section of the bottle so that when assembled on the side wall thereof the band will be held securely and snugly against such side wall by the retaining means.

Further, while the invention has been described with reference to the use of only one reinforcing band on the flexible side wall of a plastic bottle, it is obvious that two or more similar narrower bands may be alternatively assembled on the side wall of such bottle by means of suitably spaced ribs, lugs or other retaining means formed or molded on the bottle, to thus also accomplish the objects and advantages of the invention.

The preferred polyethylene bottle of the invention, although employed especially for packaging reagent hydrofluoric acid, may be applied in the same manner for successfully packaging and storing other acids such as hydrochloric, fluoboric and hydrofluosilicic acid as well as other chemicals including ammonium hydroxide, sodium hydroxide, and metallic fluoborates.

Since various changes and modifications may be made without departing from the scope of the invention, the above is to be taken as illustrative and not in a limiting sense.

We claim:

1. A polyethylene plastic bottle comprising a flexible side wall of circular cross section, a horizontally disposed rib molded around the upper outer surface of said side wall, a plurality of lugs molded in spaced horizontal relation around the lower outer surface of said side wall and a tough substantially rigid circular reinforcing band having an inside diameter barely larger than the outside diameter of said side wall and smaller than the outside diameter of said rib, encasing the outer surface of said side wall between said rib and said lugs with the upper and lower edges of said band positioned closely adjacent said rib and said lugs respectively, whereby said band is held substantially securely and snugly against the outer surface of said side wall.

2. A polyethylene plastic bottle comprising a flexible side wall of circular cross section, a horizontally disposed rib molded around the upper outer surface of said side wall, a horizontally disposed rib molded around the lower outer surface of said side wall, and a tough substantially rigid circular reinforcing band having an inside diameter barely larger than the outside diameter of said side wall and smaller than the outside diameter of said ribs, encasing the outer surface of said side wall between said ribs with the upper and lower edges of said band positioned closely adjacent said upper and lower ribs respectively, whereby said band is held substantially securely and snugly against the outer surface of said side wall.

3. A bottle constructed of a thermoplastic resinous material, comprising a flexible cylinder closed at one end and drawn to a neck at the other end, an external rib encircling the cylinder and integral therewith and spaced from the ends thereof, a plurality of external lugs integral with said cylinder and spaced from the ends thereof and from said rib so that the portion of said cylinder between said rib and said lugs constitutes from about one third to two thirds of the surface of said cylinder, and a tough substantially rigid cylindrical reinforcing band snugly encasing said portion of said cylinder and secured against longitudinal movement by said rib and said lugs.

4. A bottle constructed of a thermoplastic resinous material, comprising a flexible body portion, retaining means integral with the outer surface of said body portion and a continuous, tough substantially rigid reinforcing band skirting said outer surface and held substantially securely and snugly thereagainst by said retaining means.

5. A plastic bottle constructed of a thermoplastic resinous material, comprising a flexible body portion, a rib and a plurality of lugs molded on the outer surface of said body portion and a continuous, tough substantially rigid reinforcing band skirting said outer surface and held substantially securely and snugly thereagainst by said rib and said lugs.

WILLIAM H. GUSHARD.
JAMES J. STAITI.

REFERENCES CITED

The following references are of record in the file of this patent:

UNITED STATES PATENTS

| Number | Name | Date |
|---|---|---|
| 566,761 | Hosmer | Sept. 1, 1896 |
| 639,350 | Brown | Dec. 19, 1899 |
| 777,477 | Lord | Dec. 13, 1904 |
| 1,344,760 | Goddard | June 29, 1920 |
| 2,099,055 | Ferngren | Nov. 15, 1937 |
| 2,219,576 | Moreland | Oct. 29, 1940 |
| 2,232,475 | Renfrew et al. | Feb. 18, 1941 |